United States Patent [19]
Stoneham et al.

[11] Patent Number: 4,972,213
[45] Date of Patent: Nov. 20, 1990

[54] CAMERA APPARATUS FOR MAGNETICALLY RECORDING ON FILM

[75] Inventors: Jeffrey R. Stoneham, Spencerport; Patricia A. Dwyer, Rochester, both of N.Y.

[73] Assignee: Eastman Kodak Company, Rochester, N.Y.

[21] Appl. No.: 504,067

[22] Filed: Mar. 28, 1990

Related U.S. Application Data

[63] Continuation of Ser. No. 417,336, Oct. 5, 1989, abandoned.

[51] Int. Cl.$^5$ ................................................ G03B 7/00
[52] U.S. Cl. ........................................ 354/21; 354/203
[58] Field of Search .............................. 354/21, 75-79, 354/105, 106, 203; 352/137

[56] References Cited
U.S. PATENT DOCUMENTS 2,753,777 7/1956 Faulhaber et al. .................. 354/203
3,563,144 2/1971 Fukino ................................ 354/203
4,864,332 9/1989 Harvey ................................. 354/21

Primary Examiner—Brian W. Brown
Attorney, Agent, or Firm—Roger A. Fields

[57] ABSTRACT

A magnetic head is mounted directly on a camera film platen which is supported for limited constrained movement to maintain a precise relationship between an information track and a film edge. The platen serves to maintain film flatness while providing the desired relationship between the magnetic head and film edge.

6 Claims, 6 Drawing Sheets

CAMERA APPARATUS FOR MAGNETICALLY RECORDING ON FILM

This is a continuation of application Ser. No. 417,336, filed Oct. 5, 1989, now abandoned.

CROSS REFERENCE TO RELATED APPLICATIONS

Reference is made to the following commonly assigned copending applications:

1. U.S. Ser. No. 282,419, entitled CAMERA APPARATUS FOR MAGNETICALLY RECORDING ON FILM, and filed Dec. 9, 1988 in the name of Douglas A. Pearson.
2. U.S. Ser. No. 254,914, entitled CAMERA APPARATUS FOR MAGNETICALLY RECORDING ON FILM, and filed Oct. 7, 1988, in the name of Richard R. Kelbe.
3. U.S. Ser. No. 254,906, entitled CAMERA APPARATUS FOR MAGNETICALLY RECORDING ON FILM, and filed Oct. 7, 1988, in the names of Michael L. Wash and Conrad Diehl.
4. U.S. Ser. No. 254,903, entitled CAMERA APPARATUS FOR MAGNETICALLY RECORDING ON FILM, and filed Oct. 7, 1988, in the names of Michael L. Wash and Christopher T. Mattson.
5. U.S. Ser. No. 255,693, entitled FILM INFORMATION EXCHANGE SYSTEM USING DEDICATED MAGNETIC TRACKS ON FILM and filed Oct. 7, 1988, in the name of Robert P. Cloutier et al.
6. U.S. Ser. No. 221,955, entitled MOTOR-DRIVEN FILM TRANSPORT APPARATUS, and filed July 20, 1988 in the name of Donald M. Harvey. U.S. Ser. No. 221,955 is incorporated into this application by reference.
7. U.S. Ser. No. 206,407, entitled, as amended, THREE PART DECODER CIRCUIT, and filed June 14, 1988 in the name of Michael L. Wash.
8. U.S. Ser. No. 206,408, entitled, as amended, THREE PART ENCODER CIRCUIT, and filed June 14, 1988 in the names of Arthur Whitfield and Michael L. Wash.
9. U.S. Ser. No. 206,553, entitled, as amended, THREE PART DECODER CIRCUIT, and filed June 14, 1988 in the name of Arthur Whitfield.
10. U.S. Ser. No. 206,646, entitled METHOD FOR MODULATING A BINARY DATA STREAM, and filed June 14, 1988 in the name of Michael L. Wash.
11. U.S. Ser. No. 254,907, entitled CAMERA APPARATUS FOR PREVENTING DOUBLE EXPOSURE and filed Oct. 7, 1988, in the name of James W. Cannon.

BACKGROUND OF THE INVENTION

Field of the Invention

This invention relates to magnetic recording apparatus for cameras and more particularly to magnetic recording apparatus for photographic still cameras.

Description of Related Applications

In commonly assigned copending application Ser. No. 282,419, cross referenced above, there is disclosed apparatus for recording information on a virtually transparent magnetic coating covering the non-emulsion side of photographic film. The apparatus disclosed includes a magnetic head supported on a carriage which is mounted on a film platen for movement relative to the film platen substantially perpendicular to the longitudinal axis of the film. A spring mounted on the carriage biases the carriage toward the longitudinal axis of the film so that a pair of pins extending from the carriage engage an edge of the film to maintain a precise relationship between the recorded information track and the film edge.

The apparatus described in application Ser. No. 282,419 achieves its intended results. However, it is mechanically complex and increases the cost of the camera.

SUMMARY OF THE INVENTION

In accordance with the present invention, a magnetic head is mounted directly on a film platen which is supported for constrained movement to maintain a precise relationship between an information track and the film edge. With this arrangement, the platen serves its normal function of maintaining film flatness while also providing the desired orientation of the magnetic head with respect to the film edge.

BRIEF DESCRIPTION OF THE DRAWINGS

Other advantages of the invention will become apparent from the following description taken in connection wit accompanying drawings wherein.

DETAILED DESCRIPTION OF THE INVENTION

Figure 1:
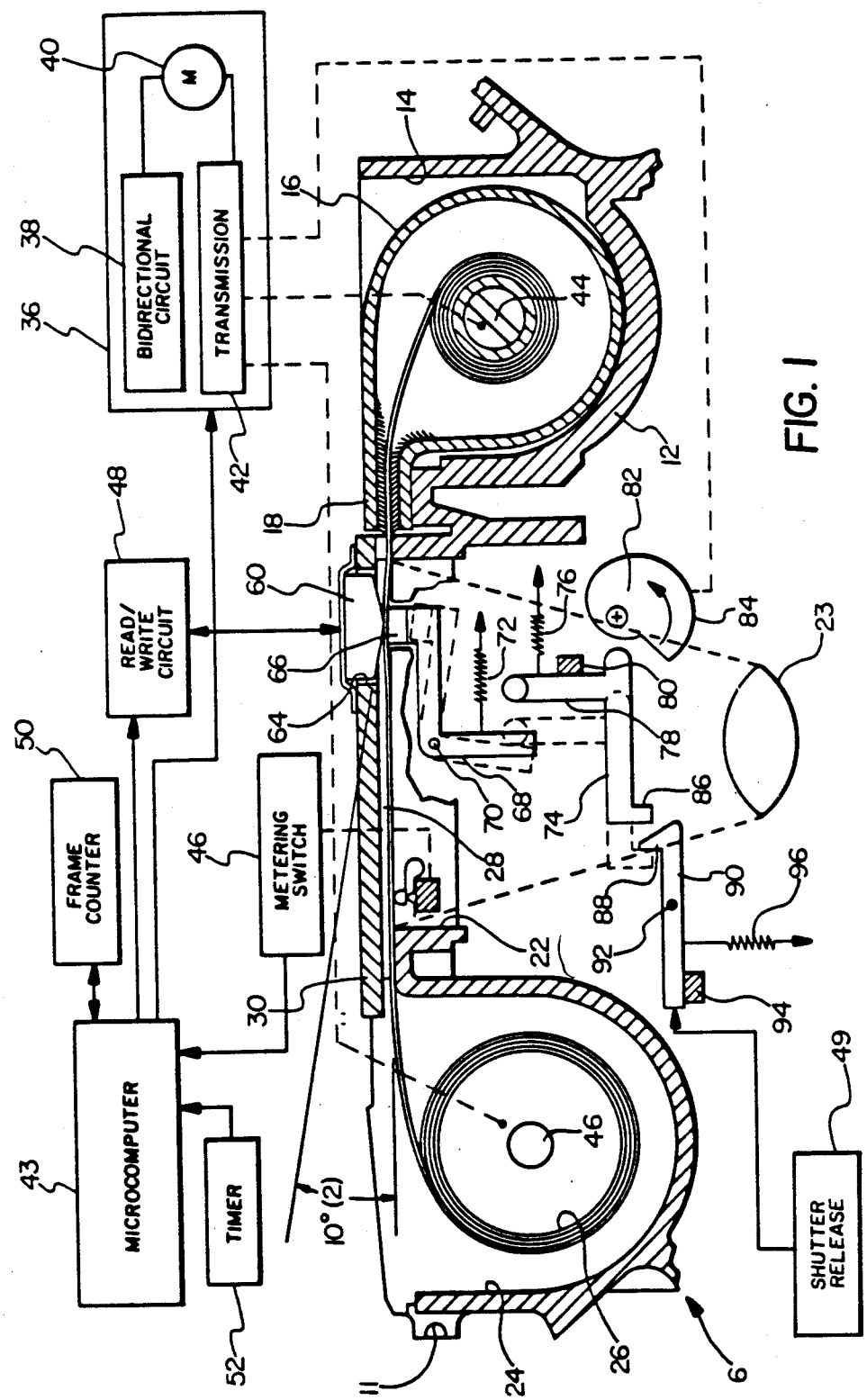
FIG. 1 is a cross section of a portion of a conventional photographic still camera illustrating a magnetic recording apparatus in accordance with the present invention.
Figure 2:
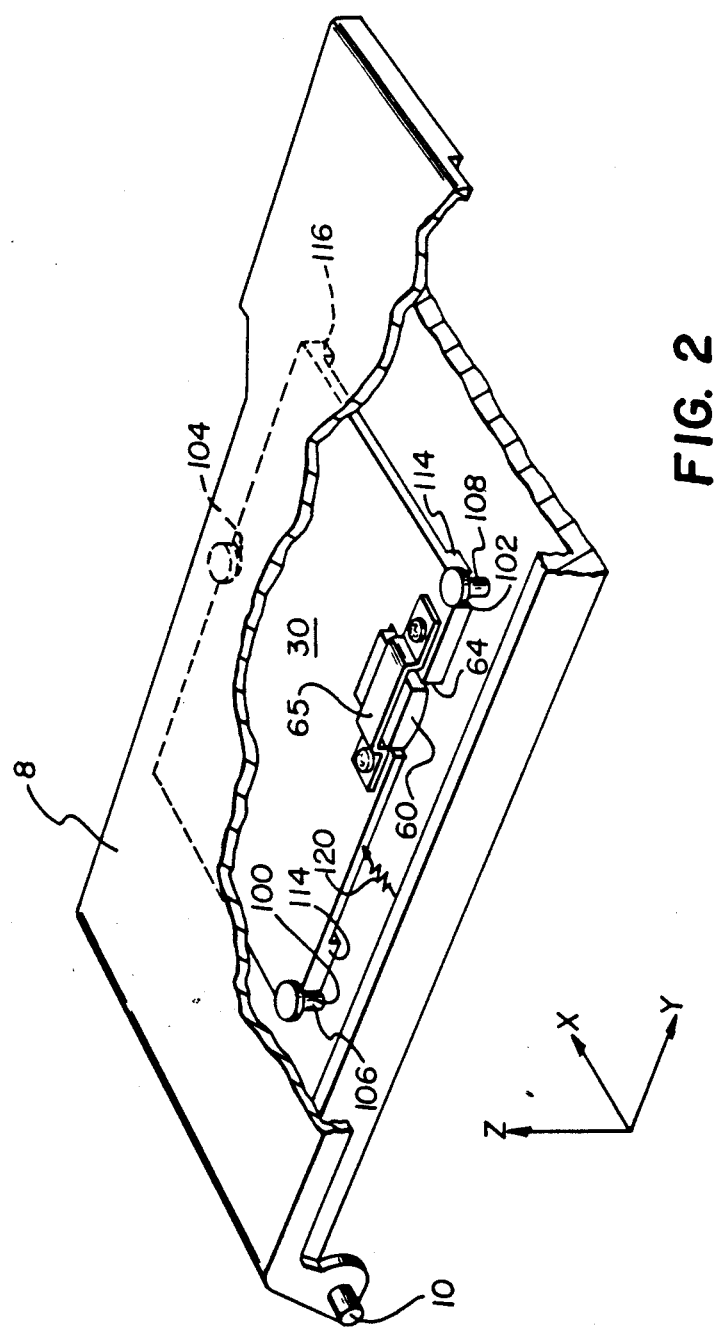
FIG. 2 is a perspective view of the back or door for the camera illustrated in FIG. 1 cut away to illustrate the platen and recording module.
Figure 3:
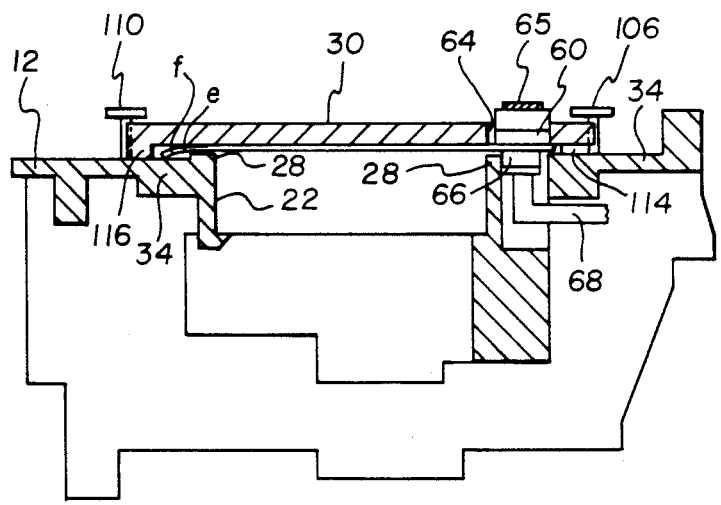
FIG. 3 is a cross section taken perpendicular to section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 10 are received in holes 11 in frame 12. Since such cameras are well known in the art, features not necessary for an understanding of the present invention have been omitted or shown in block diagram to simplify the disclosure. Also, the invention will be described with reference to a single magnetic head. However, it is to be understood that a camera can be provided with a plurality of heads for multi-track recording.

The camera 6 comprises a frame or housing 12 having a chamber 14 at one end thereof for receiving a film cartridge 16. The cartridge 16 which is shown more clearly in FIGS. 4 and 5, preferably takes the form of the film cartridge disclosed in the referenced copending application U.S. Ser. No. 221,955 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier et al. and entitled FILM INFORMATION EXCHANGE SYSTEM USING DEDICATED MAGNETIC TRACKS ON FILM, the areas (r) would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

Figure 4:
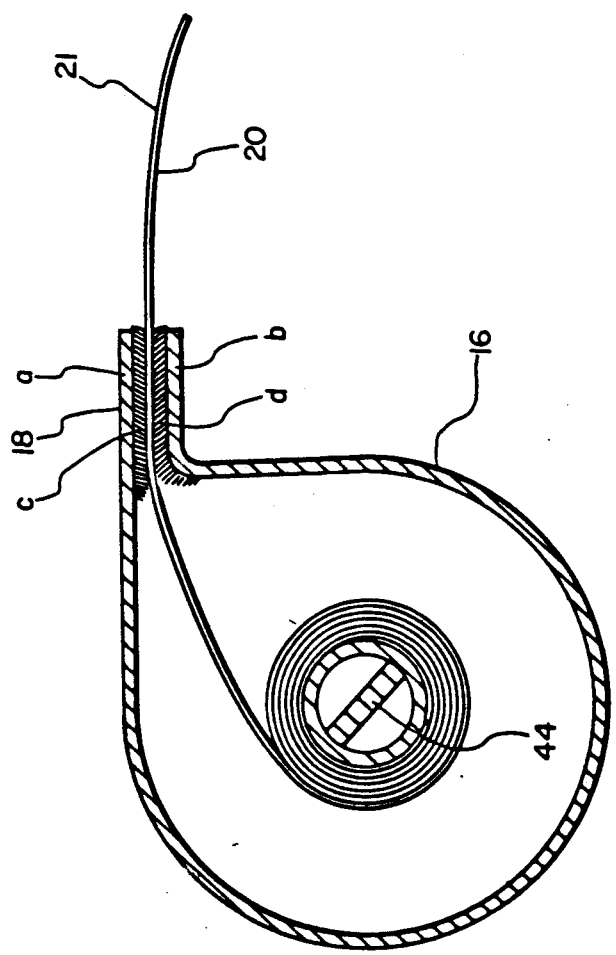
FIG. 4 is an enlarged cross section of a film cartridge.
Figure 5:
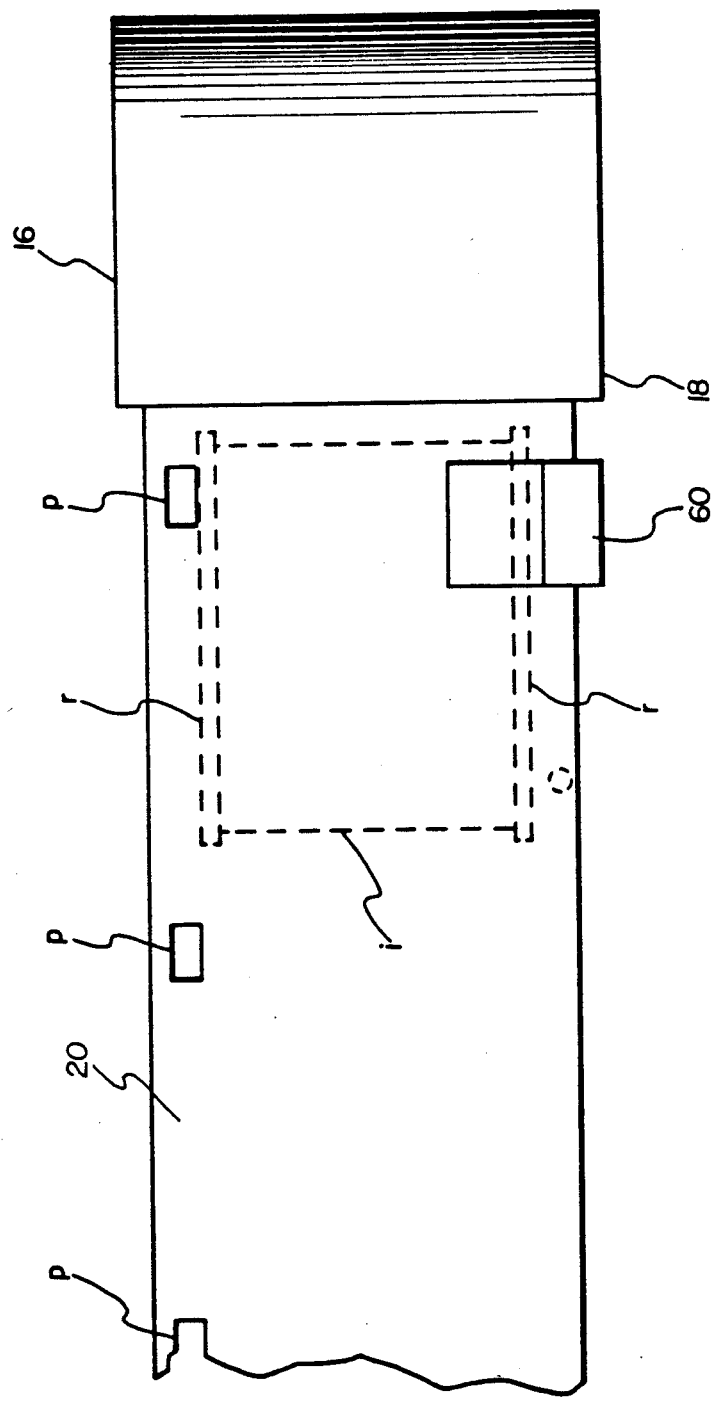
FIG. 5 is an enlarged top view of the film cartridge shown in FIG. 4 with the film partially withdrawn.

As shown in FIG. 4, the lip 18 comprises upper and lower spaced flanges (a) and (b) which serve to clamp upper and lower pieces of plush material (c) and (d) to opposite sides of the film.

As is well known in the art, the surfaces of cartridge 16 and lip 18 engage complemental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the art. Typically, they operate to advance the film frame by frame from the cartridge to the take-up spool or, if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on the camera body 8. The platen 30 comprises a flat rectangular plate having planar dimensions complemental to the rectangular exposure opening 22. As described in more detail below, platen 30 is supported on the camera body for slight constrained movement relative to platen support surfaces 34, whereby it will engage the film 20 and urge it with slight pressure toward rails 28. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 30 and the rails 28 is in the range of 0.25-0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism 49, a conventional digital frame counter 50 and a conventional timer 52. These components are all controlled from the micro computer 43 in a manner well known in the art and since they form no part of the present invention, further description is deemed unnecessary.

Magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending applications U.S. Ser. Nos. 206,407, 206,408 and 206,553, and the code format preferably takes the form of that disclosed in the referenced copending application Ser. No. 206,646.

A conventional rectangular shaped magnetic read/write head 60 having a v-shaped or curved bottom surface is connected to the read/write circuit 48. The head is retained in an opening 64 in platen 30 by a bracket 65 and is positioned so that the head will engage the transparent magnetic coating of the film in the region adjacent the lip 18 of cartridge 16. The position of head 60 is adjusted so that the head will maintain slight contact (i.e. within 10 micro-inches) with the magnetic coating of film 20.

A compliant Pressure pad 66 formed from resilient material and carried by a pivotal lever 68 is positioned below the magnetic head 60 and on the opposite side of the film from the head. The lever 68 is mounted on a pin 70 and biased counterclockwise by a spring 72 toward the position shown in solid lines to thus urge pressure pad 66 into engagement with film 20 with a bias force of 14-56 grams. A second lever 74 biased to the right by a spring 76 is mounted on the camera body for rectilinear movement. The lever 74 has an arm 78 which engages a stop 80 under the influence of spring 76. A cam 82 driven by the transmission 42 has a cam rise 84 which upon rotation of the cam 82 will engage lever 74 and displace it to the left to the position shown in dashed lines. During such movement, the arm 78 will engage and pivot lever 68 clockwise against the bias of spring 72. During such movement, the angled end 86 of lever 74 will move by the latch portion 88 of a pivotal lever 90 mounted on a pin 92 and biased into engagement with a stop 94 by a spring 96. The angled end 86 of the lever 74 will become latched in the position shown in solid lines and the lever 68 will be held in the position shown in dashed lines to hold pad 66 away from the film. The lever 90 can be subsequently rotated clockwise against the bias of spring 96 to release the lever 74 to permit the parts to return to the positions shown in solid lines.

In operation of the pressure pad and associated mechanism, the lever 68 will assume the position shown in solid lines to hold the pressure pad 66 into engagement with the film to urge the film into contact with the head 60 while the film is in motion. Near the end of advance of a film frame, rise 84 of cam 82 will engage lever 74 and displace it to the left until its angled end 86 is latched by latch 88. The parts will assume the positions shown in dotted lines and the pad 66 will now be displaced from the film. At the end of the film exposure frame, the shutter release mechanism will actuate lever 90 to release lever 74 so that the parts will again assume the position shown in solid lines during advancement of the next frame to an exposure position. The pad 66 is thus held into engagement with the film during film advancement to assure adequate magnetic coupling between the head and magnetic coating and released during film exposure to prevent distortion of the film plane. The apparatus thus achieves reliable recording in a photographic still camera without affecting image quality.

Figure 6:
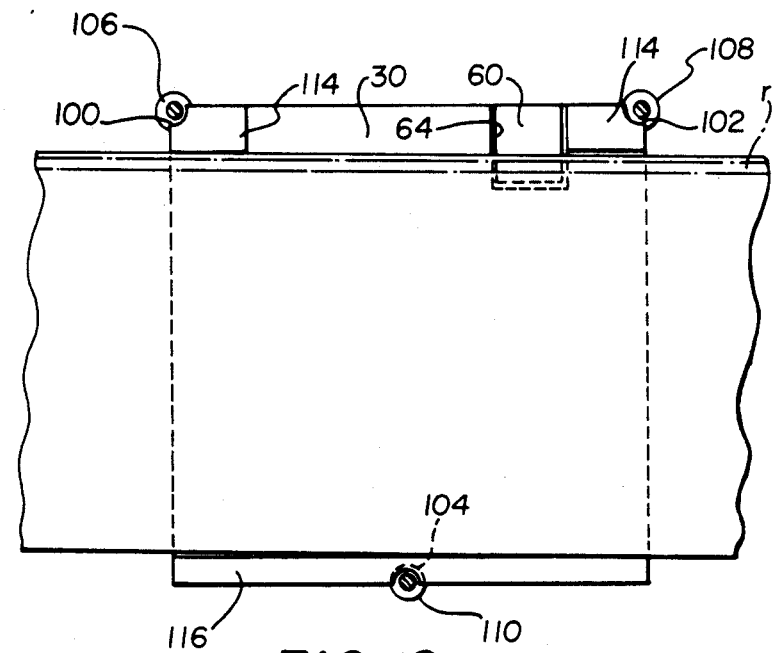
FIG. 6 is a bottom view of the film platen shown in FIGS. 1, 2 and 3.

Referring to FIGS. 2 and 6 and the head and platen arrangement, the platen 30 is provided with three curved recesses 100, 102 and 104 into which extend three pins 106, 108 and 110 fixed to the camera body. The pins 106, 108, 110 may be formed integrally with the camera body or may comprise separate parts threaded into the camera body.

As will be apparent from FIG. 2, recesses 100 and 108 are located in the corner portions of one side of the platen 30 while recess 104 is located at substantially the midpoint of the opposite side of the platen. Each pin is provided with a flat head or flange which extends slightly over the upper surface of the platen. With this arrangement, the upstanding portions of the pins 106, 108 and 110 constrain the platen in the X and Y directions and the head portions of the pins restrain the platen in the Z direction as indicated by the arrows in FIG. 2. By providing slight clearances between the platen and the pins, the platen will "float" within the constrains of the pins and maintain the desired film flatness.

Referring specifically to FIG. 6, the platen 30 is provided with a pair of spaced abutments or guide shoes 114 on its bottom surface along one edge and a guide rib 116 along the opposite edge. The shoes 114 are provided for riding on the edge of the film and for controlling the distance between the film edge and the magnetic head gap. The spacing of the shoes thus defines a "pivot length" for the film. The guide 116, in conjunction with the guide shoes 114 on the opposing side of the platen, restricts the maximum amount of skew the film strip can have with respect to the platen and, therefore, the magnetic head which is rigidly mounted by the platen. By controlling the dimension and tolerances of the pivot length and the length from the guide to the shoes, the maximum skew of the film can be restricted to 1.35 degrees. By controlling the skew to 1.35 degrees or less, the maximum signal loss that can be induced by the skew (also called azimuth error) can be limited to 25%. A signal loss of 25% or less is a viable magnetic read/write system. The significance of this is that no extra parts are needed, such as springs, to follow the film edge and control the azimuth error. This will allow any roll of film which had been partially exposed in an inexpensive magnetic recording camera designed to read and/or record one or two tracks to be interrupted mid-roll, loaded into any other camera having a magnetic head mounted in the same manner and be properly read magnetically provided the magnetic data is written and read at substantially the same rate.

Figure 7:
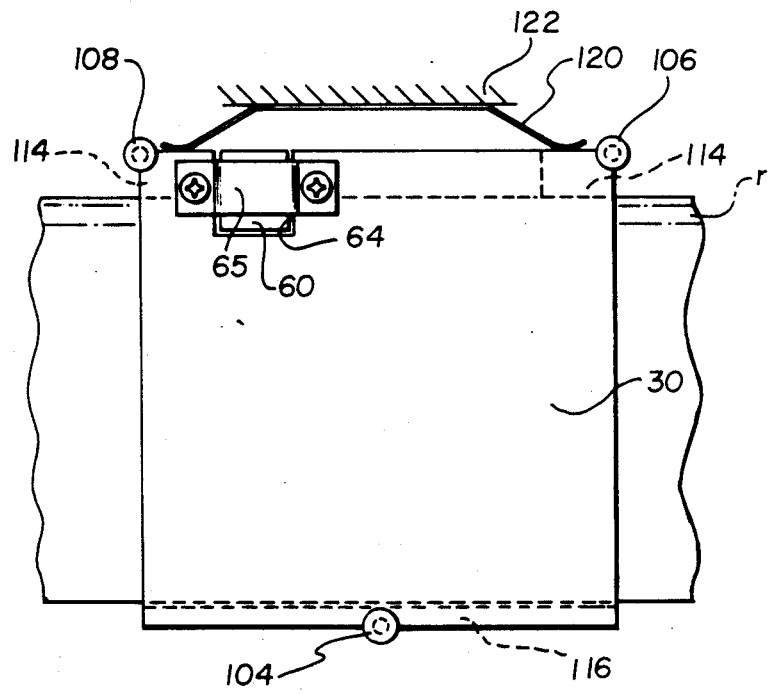
FIG. 7 is a top view of the film platen illustrating another and a preferred embodiment of the invention.

Referring to FIG. 7, another embodiment of the invention is shown. In this embodiment, a spring 120 is mounted between the edge of the platen 30 and a fixed surface 122 of the camera body to urge the pads 114 into engagement with the film edge. All other parts are identical to those depicted in FIGS. 2 and 6. With this arrangement, the spring will insure the proper orientation of the head with respect to the film edge because the shoes will follow the film edge and maintain the skew to a minimum. This embodiment has particular utility in a sophisticated camera where as many as three information tracks are utilized.

While the invention has been shown and described with reference to a preferred embodiment thereof, it will be apparent that various changes may be made without departing from the scope of the invention as defined by the appended claims.

We claim:

1. In a photographic still camera for transporting a photographic film over an exposure opening to expose frames of a film having a magnetic surface for magnetically recording information on the film, said camera comprising:
    a camera body having an exposure opening;
    a film platen for engaging the film to retain it in an exposure plane adjacent said opening;
    a magnetic head fixed to said platen to engage the magnetic surface of the film in said plane; and
    means for constraining the platen for limited movement in directions parallel to the film plane and limited movement in a direction perpendicular to the film plane.

2. A photographic still camera as claimed in claim 1 further including guide surfaces located on at least one side of said platen adapted to be engaged by the edges of the film.

3. A photographic still camera as claimed in claim 2 further including means for biasing said platen in a direction transverse to the longitudinal axis of the film to urge said guide surfaces into engagement with the film.

4. A photographic still camera as claimed in claim 2 wherein said constraining means comprises a plurality of abutments extending from said camera body adjacent selected edge portions of said platen.

5. A photographic still camera as claimed in claim 4 wherein said platen has two curved recesses in one edge of said platen and a curved recess in the opposite edge and said abutment means comprises pins extending from said camera body into said recesses, said pins having portions on their upper ends which extend over the platen to constrain its movement perpendicular to the film plane.

6. A photographic still camera as claimed in claim 5 further including a spring for biasing said platen into engagement with said pins on one side of said platen.

* * * * *